United States Patent [19]

Bigelow et al.

[11] 4,171,874
[45] Oct. 23, 1979

[54] EVENLY ILLUMINATED DISPLAY DEVICES

[75] Inventors: John E. Bigelow, Clifton Park; Donald E. Castleberry, Schenectady, both of N.Y.

[73] Assignee: General Electric Company, Schenectady, N.Y.

[21] Appl. No.: 823,385

[22] Filed: Aug. 10, 1977

Related U.S. Application Data

[63] Continuation-in-part of Ser. No. 687,871, May 19, 1976, abandoned, which is a continuation of Ser. No. 546,793, Feb. 3, 1975, abandoned.

[51] Int. Cl.² .................................................. G02F 1/13
[52] U.S. Cl. ...................................... 350/345; 350/201
[58] Field of Search ............... 350/345, 199, 200, 201, 350/293

[56] References Cited

U.S. PATENT DOCUMENTS

| 1,740,609 | 12/1929 | Lebby | 350/201 |
|---|---|---|---|
| 2,477,331 | 7/1949 | Epstein | 350/201 |
| 3,446,916 | 5/1969 | Abel et al. | 350/293 |
| 3,653,138 | 4/1972 | Cooper | 350/345 |
| 3,834,792 | 9/1974 | Janning | 350/341 |
| 3,840,695 | 10/1974 | Fischer | 350/345 X |

OTHER PUBLICATIONS

Brown: "Modern Optics", Reinhold Publishing Corp., New York, 1965, pp. 444–446.
Wright: "An Aplanatic Reflector with a Flat Field Related to the Schmidt Telescope", Publications of the Astronomical Society of the Pacific, vol. 47, 1935, pp. 300–304.

Primary Examiner—Edward S. Bauer
Attorney, Agent, or Firm—Geoffrey H. Krauss; Joseph T. Cohen; Marvin Snyder

[57] ABSTRACT

The molecules in a twisted nematic liquid crystal are, in general, skewed relative to the optical axis of the cell (the perpendicular to the plane surfaces defining the boundaries of the crystal cell), and their birefringent effect on plane polarized light varies asymmetrically for such light making varying angles with the optical axis of the cell. When the cell is positioned between crossed polarizers and the cell is energized so that light is supposed to be completely extinguished, some rays are nevertheless transmitted so that the transmitted intensities at different viewing angles vary. To avoid this resulting variation of intensity with viewing angle, the cell is illuminated from behind with collimated light (i.e., all rays parallel to the optical axis of the cell) so that all rays "see" the average molecular director in the same way; a solid catadroptric element is utilized to both collimate the light and achieve essentially constant luminous flux intensity upon the display. To restore a reasonably wide angle of view, a diffuser is positioned in front of the display. The invention may be used with any type of display device which has a transmission characteristic which varies with the angle of rays passing therethrough.

12 Claims, 6 Drawing Figures

EVENLY ILLUMINATED DISPLAY DEVICES

This application is a continuation-in-part of co-pending application 687,871, filed May 19, 1976, and now abandoned, which is a continuation of application 546,793, filed Feb. 3, 1975 and now abandoned.

This invention relates to display devices exhibiting variations in their transmissivity characteristics at different viewing angles. More specifically, this invention concerns apparatus for making such display devices exhibit a uniform distribution of light intensity when viewed over a relatively large angle.

A known type of display device utilizes a twisted nematic liquid crystal material in a cell positioned between a pair of plane polarizers, so that application of of an electric field (i.e., voltage) across the nematic substance will cause a change in its effect on polarized light so as to cause a substantial change in the intensity of the light transmitted through the second polarizer. For example, if a first polarizer is positioned between a light source and the cell and a second plane polarizer is positioned in front of the cell with its plane of polarization at 90° to that of the first polarizer, the 90° twisted nematic liquid crystal material will cause rotation of the plane of polarization of the light between the two polarizers so as to cause the light to emerge at relatively high intensity from the second polarizer, in the absence of an electric field applied across the nematic liquid crystal substance. Upon application of a suitable d.c. or relatively low frequency a.c. voltage across the cell, the molecules of the liquid crystal substance will be disordered from their spiral staircase-like twisted configuration to a relatively simple configuration in which the molecules (if of positive dielectric anisotropy) are substantially aligned with the voltage gradient (i.e., are close to being parallel with the optical axis of the cell, which optical axis is perpendicular to the planar front and back surfaces through which the light passes). Unfortunately, this type of display device utilizing a twisted nematic liquid crystal substance exhibits an assymmetrical so-called conoscopic figure, which is a representation of the relative transmission intensity versus the angle of view at which the display device is seen from the side opposite to that of the light. The reason for this lack of symmetry in the conoscopic figure is that the average or median orientation of the liquid crystal molecules (as conveniently represented by the director or longitudinal axis of the molecule) is completely assymmetrical relative to the optical axis; in other words, the average molecular axis is angled relative to the optical axis. For this reason, light rays traveling at different angles relative to the optical axis experience a differing effect caused by the optical birefringence of the nematic liquid crystal molecules. For example, light rays traveling substantially parallel to the average director of the molecules will experience substantially no birefingence effects since it "sees" the molecule end -on; in optical terms it may be said that this ray is along the "optic" axis of the liquid crystal so as not to experience any birefringent effect. On the other hand, a ray that is traveling in the same plane as the first mentioned ray and the director of the nematic liquid crystal molecules but so as to be substantially perpendicular to the director will "see" a maximum birefringent effect; specifically, the components of the ray vibrating parallel and perpendicular to the director will experience a maximum amount of relative phase retardation because of the birefringent nature of the molecules. Rays in other directions but in the plane defined by the two just discussed rays, parallel and perpendicular to the average molecular director, will experience a differing amount of birefringent effects and therefore a different amount of change of polarization. Thus, the ray that is substantially parallel to the average molecular director is unaffected by the birefringence of the molecules and will reach the second polarizer in its original perpendicularly plane polarized condition so as to be substantially perfectly extinguished. On the other hand, rays that have passed through the cell while making a substantial angle relative to the average molecular director will be substantially affected by the birefringent nature of the liquid crystal material and, more particularly, will undergo polarization changes which will vary depending on the exact angle that the ray made relative to the average molecular director. Thus, there is a direction substantially parallel to the average molecular director for which a ray "sees" no birefringent effects of the nematic liquid crystal material at all, while there is another direction substantially perpendicular to this first direction in which a ray will experience the maximum birefringent effect of the molecule. Perhaps more important, however, is the fact that in directions between this first and this second ray, the birefringent effects on each of the rays is different so that there will be some directions in which the change of polarization is of the type which will allow the rays to pass through the second polarizer to at least some extent and other angles or directions in which the polarization plane of a ray (because of the particular birefringent effect of the nematic liquid crystal) has been rotated substantially 90° so as to pass through the second polarizer more or less completely (despite the fact that the electric field is present across the nematic liquid crystal material so that it is not twisted).

Thus, it may be seen in general that there is a nonsymmetrical transmission pattern of the entire device relative to the angle of view (it being assumed that only those rays that enter and exit the cell along a given direction can be seen from a similar direction outside of the cell). Stated in other terms, the conoscopic figure (which is a plot of the relative transmission (shown merely as a variation in blackness or whiteness) versus the angle of view of a display device) has its darkest spot not on the center corresponding to the optical axis of the display device and liquid crystal cell, but rather this spot is decentered by an angle substantially equal to the angular direction of the nematic molecule director and in the same direction. Thus, instead of the transmission through the device forming a conoscopic figure that shows symmetry relative to the optical axis of the entire device, rather one obtains a conoscopic figure with the point of symmetry being that corresponding generally to the projection of the average direction of the molecular director. Thus, in general, the transmission at different viewing angles varies (assuming that the viewing angles are measured relative to the optical axis as is customary) in an asymmetric manner. This means that even at a particular viewing angle (measured relative to the optical axis) as one moves his eye in a circle (so that the viewing angle is always the same in degrees but in different directions relative to the optical axis) the display may change substantially as to its transmitted intensity. Obviously, this means that that part of the display which is intended to be, say, dark or black may pass through different shades of gray and even appear substantially "white" when one merely moves from one position to another even though the "absolute" viewing angle (i.e., the magnitude of the angle between the line-of-sight and the optical axis) is constant.

The situation becomes even more unfavorable when the nematic liquid crystal material is not "monocrystalline", that is, when the material in different parts of the cell exhibits different "handedness" of twist and/or different "tilt" angles (of the individual molecules) relative to some fixed plane (say, the planar surfaces of the cell itself). Then the direction of the average molecular director of the material in one part of the cell is different from the direction of the average director of at least some other part. Then, even for the same direction of entering and exiting rays, the two parts of the cell affect the polarization of the light differently, so that even at the same direction of view the two parts exhibit different degrees of "blackness" (relative opaqueness). Thus, a cell containing such "polycrystalline" liquid crystal material will transmit varying amounts of light (at the same incident and viewing angle) in each part of the cell that has a different orientation of the molecules, so that the overall appearance is one of mottling or "blotchiness". In other words, different parts may be at different shades, anywhere from black through gray to white, despite the fact that (say, with the electric field "on") all areas are supposed to be, say, "black" (i.e., opaque). Furthermore, with such polycrystalline material, each shade of "gray" (including anything from black through white, inclusive) of each part will change, generally in a different way, everytime the direction of viewing is changed, so that "black" (or almost black) areas may become relatively highly transmitting while other areas, previous almost "white" may become relatively opaque when the viewing direction is changed. Again, it is not necessary to change the "absolute" viewing angle, but merely the viewing direction to cause variation in relative transmissivity of such different parts of a polycrystalline liquid crystal cell, although changing the absolute viewing angle will obviously also cause such variation.

Generally speaking, any display device which has its transmissivity characteristics vary at different viewing angles (whether of the nematic liquid crystal type or not) presents a practical problem or disadvantage in most uses, where the observer often looks at it from different angular positions.

The present invention is directed at effectively eliminating all such changes of transmitted intensity at not only the same absolute viewing angle but in different positions, but also substantially eliminating such transmission intensity changes at all viewing angles for which the device is designed to be seen. This is accomplished by assuring that all rays that traverse the, say, nematic liquid crystal cell are initially parallel to each other and preferably also to the optical axis of the device as a whole, thereby assuring that all rays make the same angle relative to the average direction of the nematic molecular director. Since a display device utilizing such collimated light would normally have an extremely limited field of view (since the light leaving the cell would, of course, in general, remain collimated so as to be visible only substantially in a single direction, such as on the optical axis), a diffusing screen is positioned between the display device and the viewer so that the light is dispersed through a relatively large angle so as to be visible throughout a relatively large field of view.

An object of this invention is to improve a display device which tends to vary in its transmissivity characteristics at different viewing angles, so that it exhibits substantially constant transmission over a relatively large field of view.

A more specific object of this invention is to provide a display device of the twisted nematic liquid crystal type which exhibits substantially even transmitted light intensity over a relatively large field of view.

Other objects, features and advantages of the invention will become obvious to one skilled in the art upon reading the detailed description of an embodiment of the invention in conjunction with the accompany drawing in which.

Figure 1:
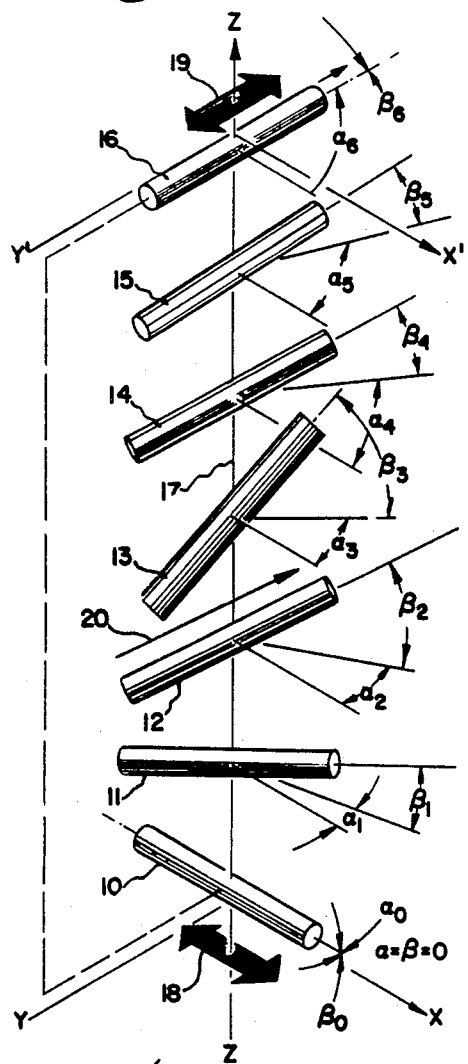
FIG. 1 is a schematic perspective representation of the manner in which the nematic liquid crystal molecules are oriented in a single series of such molecules in a 90° twisted nematic configuration.

FIG. 1 illustrates schematically the manner in which typical molecules of a 90° twisted nematic liquid crystal would be arranged as seen in perspective from a view that is mostly from the side but somewhat looking down relative to the thickness of liquid crystal cell. Specifically, the x,y plane near the bottom of the figure represents one boundary of the liquid crystal and the x',y' plane represents the other boundary (i.e., this is where the facing surfaces of the cell containing the liquid crystal would normally be). Thus, the z axis represents the perpendicular to the surfaces of the entire liquid crystal domain and therefore is the direction of the "thickness" of the liquid crystal cell. The seven elongated cylinders 10–16 schematically represent what in reality is, of course, a much larger number of nematic molecules forming a single series exhibiting the 90° twisted configuration of the nematic liquid crystal. As is well known, each of the molecules of a series will exhibit an increasing twist angle relative to a fixed line in the x,y plane as one goes from one boundary to the other in such a twisted configuration. Thus, the twist angle $\alpha$ measured from the x-axis in the x,y plane varies from zero for the lowermost molecule 10° to 90° for the uppermost molecule 16. More specifically, the various angles $\alpha_0$, $\alpha_1$, $\alpha_2$, $\alpha_3$, $\alpha_4$, $\alpha_5$, and $\alpha_6$ gradually increase for each of the exemplary molecules so as to go from zero to 90° for molecules starting at the bottom of the figure and going toward the top. This is, of course, the well known geometry of a 90° twisted nematic liquid crystal (schematically shown) which causes light passing along the z axis in the direction indicated by the arrow 17 when originally plane polarized in the x direction as indicated by the thick arrow 18 at the bottom of the figure to have its plane of polarization rotated so as to be parallel to the y axis as indicated by the thick arrow 19 at the top of the figure.

In addition to this regularly increasing twist angle $\alpha$ (measured in the x,y plane relative to some fixed direction as, for example, the x axis), the molecules in a twisted nematic crystal when an electric field is applied, typically exhibit a non-zero tilt angle $\beta$, as measured from their longitudinal axis or director relative to the x,y plane (or more generally, planes parallel to the x,y plane). Thus, in FIG. 1, it is assumed that the two extreme molecules 10 and 16 have their director parallel to the x,y plane, but that, in general, molecules in between the two boundary surfaces have non-zero and generally differing tilt angles. Thus, molecule 11 is shown as having its director making a relatively small angle $\beta_1$ with a plane parallel to the xy plane, while molecule 12 has a larger tilt angle $\beta_2$, and molecule 13 has its director making a still larger angle $\beta_3$ relative to a plane parallel to the x,y plane. On the other hand, molecules past the midpoint molecule 13, will tend to have decreasing tilt angles; thus molecule 14 is shown with a tilt angle $\beta_4$ smaller than $\beta_3$ (and in fact substantially the same as $\beta_2$), while the director of molecule 15 exhibits a tilt angle $\beta_5$ which is still smaller (and by analogy equal to $\beta_1$) and the director of molecule 16, which molcule is at the boundary of the liquid crystal, is assumed to have a zero tilt angle $\beta_6$ (i.e., its director is parallel to the x,y plane).

It should be noted that merely for illustrative purposes, FIG. 1 shows a hypothetical situation only, which corresponds approximately to the application to the cell of an electrical field slightly above the threshold field (which would not normally actually be done). In the absence of any field, all of the molecules would normally be parallel to the x-y plane so that their tilt angle $\beta$ would all be zero, but each would exhibit an increasing twist angle $\alpha$ as shown in the figure and already described. Application of the field, slightly above threshold, would then cause the molecules to assume different tilt angles depending on their distances from the (nearer) boundary of the cell, as shown and described above; but such a weak field would not in fact be used. Rather a relatively strong field would be applied so as to cause the molecules to align approximately with the field (i.e., the tilt angle would approach 90°) at least for those molecules not adjacent or very near the boundary surfaces. Nevertheless, the effect shown in FIG. 1 would exist to the extent that only the molecules at some distance from the boundaries would be at a tilt angle of substantially 90° while those quite near the boundaries would have ever decreasing tilt angles until the layer of molecules substantially at the boundaries would have small (approaching zero) tilt angles. Thus, the direction of the average molecular director would not be perpendicular to the x,y plane, but rather at some (slightly) smaller angle.

Thus, in general, in the presence of an electric field the "typical" or "average" molecules has a non-zero twist angle $\alpha$ and a non-zero tilt angle $\beta$ (measured respectively between the director and the x-axis (i.e., the x,z plane) and the director and the x,y plane, respectively). Thus, for the 90° twisted nematic, the average twist angle $\alpha$ would be 45° (see $\alpha_3$ for molecule 13), while the average tilt angle $\beta$ would be less than the maximum tilt angle (see $\beta_3$ for molecule 13). Assuming that the angle of tilt varies from a minimum at each of the two boundaries smoothly to a maximum for the molecule that is half-way in between (i.e., the exemplary molecule 13 in the schematic of FIG. 1), when an electric field slightly above threshold is applied, the average tilt angle would be a fraction, say, two-thirds of the maximum tilt angle (i.e., $\beta_3$ in FIG. 1). For a relatively strong electric field (as would, in fact, be used), only the molecules near the boundaries would be at tilt angles substantially less than 90°, but this would still cause the average tilt angle to be measurably below 90°. No attempt is made to illustrate this actual situation even schematically since it would require a very large number of molecules with most of them at a substantially 90° tilt angle and only those quite near the boundaries at decreasing (toward the boundary) tilt angles. FIG. 1 does illustrate the essential point that in the presence of any field, the average or weighted direction of the (average) molecular director is less than the maximum tilt angle ($\beta_3$ in FIG. 1); and this is true even for a strong electric field where the maximum tilt angle is 90° and an overwhelming majority of the molecules (i.e., those not quite near the boundaries) have a tilt angle at least very close to 90°, since at least some molecules (near the boundaries) have tilt angles which are substantially less than 90°. Thus, there is, in general, an average or weighted direction of the average molecule, and this is represented by the average direction of the nematic director schematically shown at 20. Thus, this average direction 20 will in the exemplary situation of FIG. 1 make a 45° angle with the x,z plane and an angle of, say, two-thirds, of $\beta_3$ with the x,y plane. In the more realistic situation of the 90° twisted nematic liquid crystal having a substantial electric field applied across its boundaries, the average direction of the nematic molecular director will still make a 45° (twist) angle with the x,z plane but a (tilt) angle close to, but less than, 90° with the x,y plane. Generally speaking this average direction of the director 20 is therefore angled relative to the optical axis of the device given by the direction 17 and lying along the z axis. This, a cone of light for which line 17 would represent the central axis passing through the liquid crystal cell from say the bottom to the top of FIG. 1 will have rays making entirely different angles relative to this average direction of the director (20), so that the birefringent effect of the "average" molecule represented by the average director will be different for each of the individual rays in such a cone.

When a suitable electrical voltage is impressed across the liquid crystal schematically illustrated in FIG. 1, the molecules will, of course, be sufficiently disturbed so that, in general, the gradual twist from one surface to the other is partially obscured by the fact that most of the molecules are parallel to the z axis; similarly, the tilt angle relationships will not, in general, appear the same as represented in FIG. 1. Nevertheless, those molecules which have less than 90° tilt angles (i.e., are not made parallel to the z or optical axis of the device) will still exhibit their original twist angle. Thus, overall, the molecules will be aligned (i.e., parallel) to each other and the z axis only to a first approximation and will exhibit both a finite though small (average) tilt angle and an average twist angle. In particular, the average direction of the director for a field being applied can be stated to have a non-zero (although small) residual twist angle A relative to the x,z plane, and an average tilt angle B relative to the x,y plane. Thus, even when the field is "on", the average direction of the nematic director is slightly angled or skewed relative to the optical or z axis. Thus, once again light attempting to pass through the cell and the two polarizers represented by arrows 18 and 19 will not be completely extinguished by the crossed polarizers because of the variable birefringent and therefore polarizing effect of the average molecule which is not parallel to the axis and therefore not parallel to the central ray of the conical beam of the impinging light.

Figure 2:
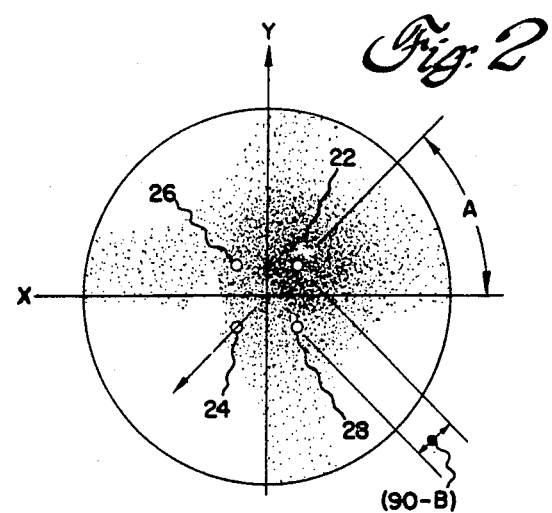
FIG. 2 is a diagrammatic representation of the conoscopic figure representing how ordinary (i.e., non-collimated) light will pass through the configuration of FIG. 1 as seen by a viewer at different viewing angles.

The situation as seen from the top is schematically illustrated by the so-called conoscopic figure as shown in FIG. 2. In this figure, the extinction of the light is shown by dark shading while transmission of the light as illustrated by the light areas. Basically, a conoscopic figure represents the light as it will be seen from the opposite side of the cell (i.e., from the top) when the cell is illuminated from the other side by a conical beam of light, and represents the darkness or lightness as seen at different viewing angles. Thus, although the x and y axis are shown in FIG. 2, basically the conoscopic figure is best thought of as in polar coordinates where any distance from the crossing of the x,y axis (which therefore defines the z axis perpendicular to the plane of the paper) represents the angle of view as measured from the z axis or optical axis of the device. Thus, if the average molecule has a twist angle equal to A in FIG. 2 and a tilt angle equal to B, then the point of intersection at 22 represents the angle of view at which one would be looking directly along the average direction of the director. Thus, point 22 represents the angle of view for which the average molecule exhibits no birefringent effects so that at this specific angle the liquid crystal cell does not affect the plane polarized light between polarizers 18 and 19 at all, so that no light can pass through both polarizers. However, at viewing angles other than that represented by point 22, the birefringent effects of the "average" molecule do affect the polarization of the original plane polarized light passing through the cell so that at such a point as 24 a substantial part of the light originally plane polarized at one side of the liquid crystal has been so affected as to readily pass through the perpendicularly oriented other polarizer even though the angle of view represented by point 24 is not very far from the optical axis. Thus, if one were to view the device schematically shown in FIG. 1 along a direction exemplified by point 24, the device would not be substantially dark as intended when the electric field is applied. To a lesser, but nevertheless measurable extent, viewing directions such as represented at 26 and 28 would also be adversely affected since at least a moderate amount of light would be able to pass through both polarizers at such angles. Thus, in general, the fact that the average direction of the nematic director is not parallel to the optical or z axis causes the device to exhibit different amounts of "darkness" at different viewing directions even though the viewing angle in absolute terms (as measured between the line-of-sight and the optical or z axis) is the same. It should be noted that the particular conoscopic figure of FIG. 2 and in particular the sense of the twist and tilt angle of FIG. 1 are purely exemplary, and that changing the sense of, for example, the twist without changing the sense of the tilt angle will cause the conoscopic figure to change in such a manner that the "good" (i.e., dark for crossed polarizers) viewing quadrant will move from the upper right to the lower right in FIG. 2 (i.e., the figure will simply be rotated 90° in a clockwise direction). Changing the sense of the tilt angle will obviously cause the conoscopic figure to be reversed; that is, if the twist is in the direction shown in FIG. 1 but the molecules are tilted so that their left hand ends are up rather than down, the "good" or darker quadrant will be the one in which point 24 is found. Stated in other terms, the situation would then be represented by a conoscopic figure which was rotated 180° relative to that shown in FIG. 2. Finally, if both the twist and the tilt angles are in the opposite sense to that shown in FIG. 1, the good or darkest quadrant in the conoscopic figure will be in the upper left hand quadrant, that is, the representative conoscopic figure will correspond to the one shown in FIG. 2 if it is rotated 270° in a clockwise direction. Thus, in general, if the average direction of the nematic director is not parallel to the z axis but rather makes an (acute) angle relative thereto, the conoscopic figure is not symmetrical reltive to z or optical axis, and the desired effect of the cell (in the exemplary embodiment darkness when the electric field is applied) will vary as to quality depending on not only the viewing angle in absolute magnitude (as measured from the z axis), but more particularly on the viewing direction as well.

In some displays, the different cells (if plural cells are used) or more commonly different parts of the same single cell may contain twisted nematic liquid crystal material which have different twist and/or tilt directions. Thus different parts of the same cell (or display) will appear lighter or darker than other parts at a fixed viewing angle. For example, the same viewing angle (at the same direction) may result in substantially complete extinction (as at point 22 in FIG. 2), partial extinction (as at points 26, 28) or almost complete transmission (as at point 24) depending on the sense of the tilt angle and twist of the molecules. Thus, some of material may have right-hand twist and a tilt angle in one sense (say, the "positive" sense) (see point 22), other parts of the material may have left-hand twist and a tilt angle in the positive sense or the negative sense (see points 26 and 28), and still other parts of the material may exhibit right-hand twist but tilt angle in the negative sense, (see point 24), rendering the differing appearance represented by the just stated points when the device is viewed from a single angled direction (e.g., represented by point 22).

In order to avoid this non-uniformity of transmitted illumination for the same absolute viewing angle (but different directions) for the same orientation of nematic liquid crystal material or for the exact same viewing angle (both as to magnitude and direction) for nematic liquid crystal material having different twist and/or tilt orientations (as just explained), the present invention utilizes collimated light, (all the rays of which are preferably parallel to the optical or z axis of the liquid crystal cell) so that there is no difference in the manner in which any of the rays "see" the average molecule even though the average direction of the various molecular directors is still not parallel to the optical axis. Stated in other terms, all of the rays encounter the same situation so that there is no differential effect on some rays relative to others. Thus, although there is still some birefringent effect because of the fact that the molecules are not seen end-on, nevertheless, all rays are affected in the same way across the entire width of the liquid cell. If the collimated rays are additionally parallel to the optical axis, then they will also "see" positive and negative tilt angles and left and right handed twist in the same way.

Figure 3:
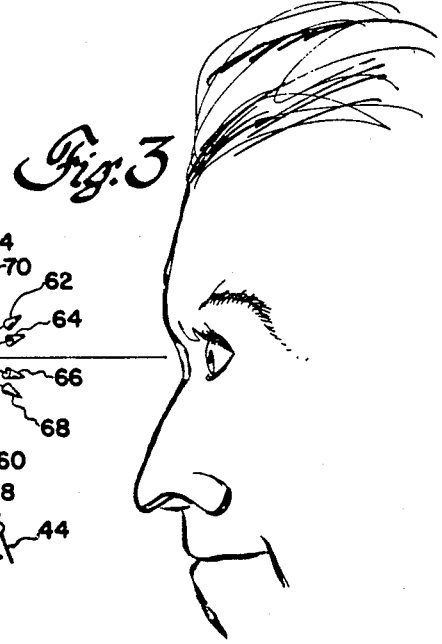
FIG. 3 is a side view of an apparatus according to one aspect of the invention and yielding substantially even transmitted illumination intensity of any viewing within a large range of angles.

FIG. 3 shows an otherwise conventional twisted nematic liquid cell 30 surrounded by a pair of plane polarizers 32 and 34, which for exemplary purposes will be assumed to have their planes of polarization at right angles relative to each other. As is well known, the liquid cell 30 comprises a thin transparent cell in which a twisted nematic liquid crystal material is contained and a pair of transparent planar electrodes 36, 38 for sometimes supplying an electric field across the liquid crystal material at 40. A source of either d.c. or relatively low frequency a.c. voltage at 42 may be optionally connected through switch 44 and leads 46, 48 to the electrodes 36, 38, respectively. When the polarizers 32, 34 have their planes of polarization mutually perpendicular, the material in cell 30 will typically consist of a 90° twisted nematic liquid crystal substance of the type schematically illustrated in FIG. 1. The so-far described elements in FIG. 3 are, of course, all conventional parts of a liquid crystal display device.

In order to illuminate the liquid crystal display device comprising elements 30–48, with collimated light, the exemplary embodiment of FIG. 3 utilizes a light source 50 which may comprise a conventional incandescent lamp with a relatively small filament 52 so as to comprise at least a substantially "point source" of light. The specific exemplary means for collimating the light from this small source is an off-axis parabolic reflector 54, receiving a substantial amount of the diverging rays 56 from the source and collimating them as parallel rays 58. As is well known, such an off-axis parabolic reflector is a section of a paraboloid which would have its axis in a horizontal direction extending through the source 52 if the paraboloid were complete. A baffle or light shield 59 is positioned as shown so as to avoid illumination of the display device by direct non-collimated rays from the source 52. The collimated rays 58 will pass through the display device parallel to the optical axis (horizontal in FIG. 3) so that all of rays encounter the various twisted and tilted molecules of the liquid crystal substance at 40 at the same angle. Thus, the light leaving the right hand surface of the cell 30 will all be of the same state of polarization when it encounters the second plane polarizer 34, so that all rays are affected by the plane polarizer 34 in the same manner. Thus, the rays will leave the plane polarizer 34 at equal intensity over the entire surface thereof and, in general, will still be collimated.

In order to increase the angular field of view at which these rays may be seen, a diffuser 60 is positioned in their path so that the rays are substantially randomly deviated so that the intensity of the rays in all directions within a substantial angle of the optical axis is equal. This is schematically illustrated by showing a series of such rays at 62, 64, 66 and 69 all originating from the single point (arbitrarily chosen as along the optical axis) which spread substantially evenly relative to the point of intersection of the original parallel ray paths and the diffusing surface 70 of the diffuser 60. Diffuser 60 may be of any conventional construction, such as a ground glass plate having its ground surface 70 adjacent the liquid crystal display device.

Although a particular arrangement for collimating the light illuminating the liquid crystal display device and in particular the liquid crystal cell thereof has been illustrated in FIG. 3, any suitable means for causing collimated light to be incident thereon may be utilized instead. Thus, besides using other arrangements of either off-axis or complete parabolic reflectors and light sources at their focal points, one may utilize either conventional lenses or Fresnel lenses in conjunction with any suitable light source instead of the lighting arrangement shown.

As stated earlier, the important consideration is that all of the light rays passing through the display device, and in particular the twisted nematic liquid crystal material 40, make the same angle with the average direction of the longitudinal axes of the molecules (i.e., the average direction of the nematic director) so that there is no preferential direction relative to the cell caused by the fact that this average direction of the nematic director (and the directors or longitudinal axes of the individual molecules in general) make an angle with the optical axis of the device. Thus, even collimation of the light does not cause elimination of birefringent effects of the molecules, but, rather, merely insures that the effects are even across the entire light beam and for all rays thereof. In this manner, when the collimated beam is ultimately diffused into different directions by the diffuser 60, the relatively brightness as seen at all angles on the right of the display and diffuser will be substantially equal regardless both as to the direction and "absolute" angle of the view (within, of course, certain limits as to the angular diffusion caused by element 60). Thus, for both when the electric field (i.e., the voltage) is impressed across the liquid crystal material and when the electric field is off, the rays passing through the liquid crystal always meet the molecules at the same angle, since the rays are always parallel to the optical axis of the cell; therefore, all rays leaving the entire surface of the cell have been affected exactly the same way. Finally, since it is these same parallel rays that are diffused in all directions by the diffuser in an even manner, the illumination intensity appears the same when viewed from the right of FIG. 3 at all viewing angles within the field of view of which the diffuser deviates the light. Thus, the problem previously described relative to FIGS. 1 and 2 is overcome by the utilization of collimated light passing through the nematic liquid crystal display device plus the utilization of a diffuser to allow the display to be seen throughout a relatively large angular field of view.

The apparatus of FIG. 3 provides illumination of essentially uni-angular characteristics to eliminate contrast changes due to twist disclinations and to avoid color and intensity changes with changing angle of view; however, the illumination intensity (I) across the exit aperture C of the reflector means is only substantially uniform. Further, the collection efficiency, i.e., the ratio of the amount of illumination directed at the display member to the total amount of illumination available from the light source, is relatively low. Both a high collection efficiency and an essentially uniform illumination intensity across the collimator exit aperture are achieved in the embodiment of FIG. 4, wherein a solid collimator member 80 is formed of a material, such as a plastic and the like, having an index of refraction n greater than the index of refraction of the surrounding medium (generally, air). Member 80 is formed with a spherical reflecting surface 81a, preferably having a coating 82 of highly reflective material, such as silver and the like, thereon. The spherical surface has a radius of curvature R and is concave with respect to the light source position 84, established along the center of revolution (the x axis) of the collimator, at a distance less than the thickness dimension T of the member. Thus, a recess 86 must be formed into the member surface 81b, opposite the reflecting surface, to allow the light source to be physically placed at the proper position relative to the reflecting surface. Recess 86 is formed with a hemispherical portion 86a symmetric about the x axis and concave towards the light source position 84, to substantially eliminate refraction of the light emanating radially outward from the point source position toward reflecting surface 81a.

Forward surface 81b is shaped to form a corrector lens, whereby member 80 is a solid catadioptric reflector having all of emerging light rays 58' collimated across the entire aperture diameter $D_a$ thereof. The distance X' between the collimating lens surface portions of forward surface 81b and the front plane (the y axis) of the member is a function of: the index of reference n of the solid member material, the distance D of the center of curvature 89 from the member front surface; the reflector radius R; and the total distance (D+d) between the light source location 84 and the reflector center of curvature 89. In a presently preferred solid collimating member with spherical reflector, having an aperture diameter $D_a$ of 3.00 inches, a radius of curvature R of 1.875 inches, a front surface-curvature center distance D of 0.9375 inches, a light source-front surface depth d of 0.1875 inches, an index of refraction n=1.6 and a source recess hemispherical radius r of 0.312 inches, the relationship between the distance Y' (along the y axis) from the axis of member rotation (the x axis) and the corrector lens distance X' is given by the equation:

$$X' = -0.2963(Y')^2 + 0.1686(Y')^4 - 0.019008(Y')^6.$$

Figure 4:
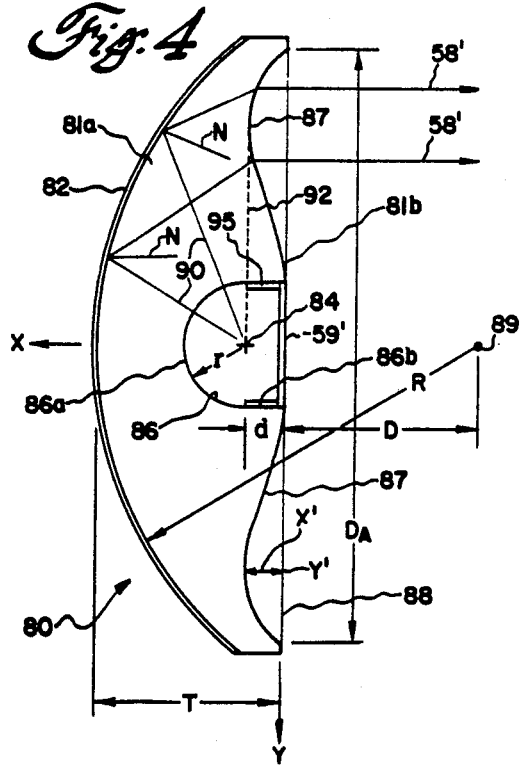
FIG. 4 is a sectional side view of a portion of an apparatus according to another aspect of the invention and yielding essential uniform illumination of the display member.

It will be seen, in FIG. 4, that each ray 90 emanating radially from point source location 84 and passing across the non-refractive interface at hemispherical surface 86a, impinges upon reflector surface 81a at some angle with respect to the normal N at each impingement point thereon. Each ray 90 is reflected upon the opposite side of the normal with essentially the same angle as the incidence angle and is impingement upon corrective surface 87 at some angle relative to the axis. Each ray is refracted at the interface between the solid material of member 80 and the surrounding medium, defined along surface 87, and is bent to lie essentially along the x axis whereby emerging rays 58' are essentially completely collimated and of essentially uniform intensity. The foregoing is true for all light rays 90 emerging from the source and being reflected by surface 81a prior to transition across the corrective surface interface; thus, any light ray along a line 92 connecting the source position 84 to any point along corrective surface 87, will emerge from corrective member 80 as an uncollimated ray of light. Therefore, opaque material 95 is coated upon the interior surface of recess 86 to a sufficient distance inward of the frontal plane (the y axis) of the corrective member to prevent light from passing from the source directly toward the corrector surface without reflection from surface 81a. Shield member 59' is positioned across the mouth of the aperture to prevent light from passing directly from the source toward the display member (situated to the right of corrector member 80 in FIG. 4, and essentially transverse to the x axis). Advantageously, shield member 59' is comprised of a disk having a cylindrical wall extending into aperture 86 the required distance to form the additional light shielding portions 95, whereby a single shield member performs both of the light-shielding functions.

Figure 5:
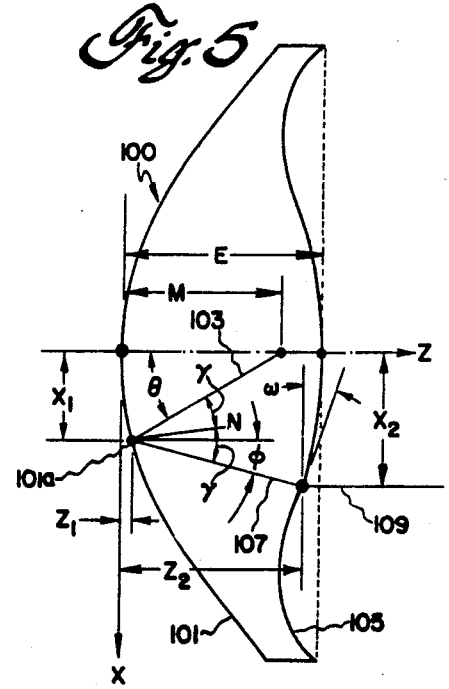
FIG. 5 is a graphic model of a catadioptric element for the apparatus, configured to yield theoretically perfect uniformity of illumination of the display.
Figure 6:
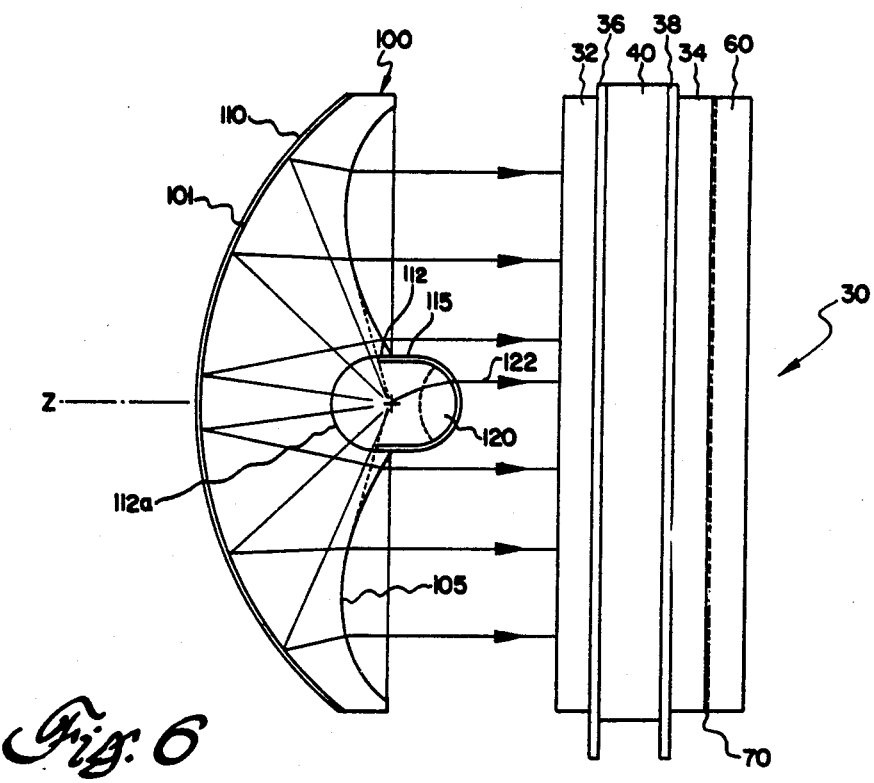
FIG. 6 is a side view of a preferred embodiment of the invention, using a catadioptric element developed from the model of FIG. 5.

Referring now to FIGS. 5 and 6, a solid, aspherical catadioptric member 100 is utilized to provide theoretically perfect uniformity of illumination across the entire aperture thereof. FIG. 5 illustrates a diametric section of a general solid aspherical reflector-corrector member; the light point source is positioned at a distance M from the origin of the X, Z coordinate system while the member has a maximum axial thickness E in the Z direction, where the origin is at the reflecting surface 101 and on the center of revolution (the Z axis) of the member. Each light ray 103 is emitted from a source at a distance M from the origin, at an angle $\theta$ with respect to the Z axis, and is impingent at some point 101a upon the reflecting surface at angle $\gamma$ with respect to the normal N to the reflector surface at the point of impingement 101a. For a constant aperture illumination value $I_0$, the coordinates $(X_1, Z_1)$ of each point 101a, with respect to the origin, is calculated, assuming initially that there is no curvature to the correcting surface 105 (i.e., the correcting surface is planar, and has a value $f_c(X) = E$, in accordance with the formula, with $Z_1 = f_r(x)$, $$\sqrt{2/I_0}(\sqrt{1-\cos\theta}) = (M-Z_1)\tan\theta + (f_c(x) - Z_1)\tan(\theta - 2\tan^{-1}(dZ_2/dX)) \quad (1)$$

This differential equation is numerically solved for values of $Z_1$ for each value of $\theta$: and the associated X value $(X_1)$ is found by solving the equation $$X_1 = (\tan\theta)(M - Z_1)$$

Thus, for a given set of values $I_0$, M and E, the aspherical $f_c(X)$ reflecting surface 101 is defined.

The ray 107 reflected from point 101a forms the angle $\gamma$ to the reflector surface normal N and forms an angle $\phi$ with respect to the reflector axis Z. Reflected ray 107 impinges upon the corrector surface 105 at a point $(x_2, z_2)$ and is refracted thereat to emerge as a ray 109 parallel to the Z axis. Thus, the surface of corrector lens portion 105, at a distance $X_2$ from the member axis, must form an angle with respect to the X axis and the values of $Z_2$ and $X_2$ are calculated in accordance with equations (2) and (3), where $$n\sin(\omega - \phi) = \sin(\omega) \quad (2)$$

and $$Z_2 = f_c(x_2) = \int_0^{X_2} \tan\omega(x)dx + E \quad (3)$$

Equation 3 is numerically integrated to yield the correct values of $Z_2$ and $X_2$.

However, equation (1) was originally solved assuming that $f_c(Z) = E$ (the corrector was a planar surface at $Z = E$); therefore, the new values of $f_c(Z)$ are substituted in equation (1) and a new set of values for both reflector and corrector found. This process is iterative and is repeated until two consecutive values of $f_r(x)$ and $f_c(x)$ are found to be equal.

The solid catadioptric reflector-corrector element 100 fabricated in accordance with the foregoing description receives a highly reflective coating 110 upon its reflector surface 101. The light source is positioned at a distance M along the Z axis from the origin, and may be located within the solid member, as in FIG. 5, or with M=E (the point source located on the axis at the aperture plane) as in FIG. 6. A recess 112 is actually formed into the corrector surface and includes a hemispherical portion 112a for purposes as explained hereinabove with reference to FIG. 4. A shield member 115, of opaque material, is positioned between the light source and the display member 30 and advantageously extends inward of the surface opening of recess 112 a distance selected to prevent light from passing from the source to the correcting surface 105 without reflection at surface 101, to prevent uncollimated rays from impinging upon the display member. Advantageously, a converging lens element 120 may be mounted between light source location M and the display member (along the Z axis), in lieu of the corresponding portion of shield member 115, to collimate those light rays emanating substantially directly from the light source toward the display member. Thus, essentially completely collimated rays of light having essentially equal intensity are directed perpendicularly upon that surface of the display member opposite diffusing means 60.

Although for purposes of clarity and definiteness the invention has been described as used with a particular display device, namely, of the twisted nematic liquid crystal type (and more particularly of the 90° twisted type utilizing a pair of "crossed" plane polarizers), it may be used with any type of display device which exhibits adverse uneven effects on transmitted rays passing through at different angles. For example, any display device using as an essential element a birefringment material will tend to exhibit such variation according to the incident angle of individual rays, since in general each differently directed ray will make a different angle with the "optic axis" of the birefrigent material. Similarly, any other type of display device which varies in transmissivity depending on the angle of the rays traversing the device can be made to exhibit even transmission over a relatively wide field of view by utilizing the teachings of the invention as previously descirbed. Accordingly, we intend to be limited only by the scope of the appending claims and not by the several preferred embodiments described herein.

What is claimed is:

1. In a display device of the type including a member having an optical axis and controlling light transmissivity, said member causing undesirable variations in the amplitude of transmitted light in accordance with the angles and amplitudes of the rays passing therethrough, the improvement comprising:
    first means for providing essentially a point source of light;
    a solid catadioptric member formed of a refractive material having a refractive index greater than one, said solid member having a reflecting surface furthest from said display member and a correcting surface nearest to said display member,
    said first means being positioned along said optical axis between said display member and said reflecting surface;
    said solid catadioptric member essentially completely collimating a major portion of the light emitted from said first means and impinging upon one side of said display member with all of the impinging light having an essentially constant intensity and having the same angle relative to said display member as said rays pass therethrough; and
    diffusing means on the opposite side of said display member for angularly spreading said collimated light after passage through said display member to cause the intensity of light on the opposite side of said display member to be substantially equal at all angular positions within a substantial angular field of view of said display device.

2. An improved display device as set forth in claim 1, wherein: said display member is of generally planar configuration having its planar surfaces substantially perpendicular to said optical axis; and said solid catadioptric member is positioned to cause said collimated light to impinge perpendicular to said planar surfaces and parallel to said optical axis.

3. An improved display device as set forth in claim 1, wherein said reflecting surface is a spherical reflector having a center of rotation positioned along said optical axis.

4. An improved display device as set forth in claim 1, wherein said reflecting surface is an aspherical reflector having a center of rotation positioned along said optical axis.

5. An improved display device as set forth in claim 1, wherein said first means is positioned between said reflecting and correcting surfaces.

6. An improved display device as set forth in claim 1, wherein said first means is positioned substantially at said correcting surface.

7. An improved display device as set forth in claim 1, further comprising opaque means at and adjacent to said correcting surface for essentially preventing passage through said solid member of essentially all of those light rays from said first means which do not impinge upon said reflecting surface.

8. An improved display as set forth in claim 7, further comprising shield means for preventing the remaining portion of the light rays from said first means from impinging upon said display member.

9. An improved display device as set forth in claim 8, wherein said opaque means is a part of said shield means.

10. An improved display device as set forth in claim 9, further comprising a converging lens substituted for a portion of said shield means, said converging lens having a focal length and a position along said optical axis both selected for causing collimation of all of that portion of the light emitted from said first means and passing toward said display member through said lens.

11. An improved display device as set forth in claim 1, wherein said display member comprises a planar cell containing a nematic liquid crystal material and in which the longitudinal axes of at least some of the molecules make an acute angle relative to said optical axis and the optical axis is perpendicular to the planar surfaces of said cell.

12. An improved display device as set forth in claim 11, wherein said display member further comprises at least one polarizing element in optical alignment with said nematic liquid crystal cell.

* * * * *